United States Patent [19]

O'Connell et al.

[11] Patent Number: 4,903,232

[45] Date of Patent: Feb. 20, 1990

[54] ELECTRONIC PROGRAMMABLE STAMPING MARKING DEVICE

[76] Inventors: James A. O'Connell, 108 Woodfield Dr., Short Hills, N.J. 07078; S. Randy Sarantos, 240 Cedar Knolls Rd., Cedar Knolls, N.J. 07927

[21] Appl. No.: 66,466

[22] Filed: Jun. 26, 1987

[51] Int. Cl.[4] .......................... G06F 3/12; B65H 25/00

[52] U.S. Cl. ................................. 364/900; 364/927.2; 364/928; 364/930; 364/929.2

[58] Field of Search .......................... 156/361; 355/14; 400/144.2, 63, 704, 705.1; 364/200 MS File, 900 MS File

[56] References Cited

U.S. PATENT DOCUMENTS

| | | | |
|---|---|---|---|
| 4,194,833 | 3/1980 | Lester et al. | 355/14 |
| 4,264,396 | 4/1981 | Stewart | 156/361 |
| 4,323,315 | 4/1982 | Demonte et al. | 400/63 |
| 4,558,965 | 12/1985 | Veda et al. | 400/144.2 |
| 4,615,631 | 10/1986 | Veda et al. | 400/705.1 |
| 4,616,946 | 10/1986 | Murata et al. | 400/704 |

*Primary Examiner*—Raulfe B. Zache
*Assistant Examiner*—Glenn Richman
*Attorney, Agent, or Firm*—Sherman and Shalloway

[57] ABSTRACT

Disclosed herein is an improved programmable marking device in two preferred embodiments thereof. In a first embodiment, the device includes a keyboard-display portion into which is mounted a removable portable marking device with the marking device having circuitry therein which is electrically connected with the computer in the keyboard-display portion when the removable portable marking device is inserted into a specially designed receptacle in the keyboard-display portion. In the operation of the first embodiment, the keyboard is used to type the message which is desired to be printed by the marking device and the desired message is displayed on the display and corrected as desired while the marking device is plugged into the receptacle. That which is displayed in the display has also been transmitted electrically to a memory device contained within the removable portable marking device. When it is desired to print the message, the marking device is removed from the receptacle and placed on the substantially planar surface at the location where it is desired to mark a message. A button is depressed to activate the marker and the message is printed exactly as it was presented in the display of the keyboard-display portion. In the second embodiment of the present invention, all of the functions described above are contained within a single self-contained portable unit. In either embodiment, other functions may be included such as time and calculation.

22 Claims, 3 Drawing Sheets

ELECTRONIC PROGRAMMABLE STAMPING MARKING DEVICE

BACKGROUND OF THE INVENTION

Printing devices are generally well-known in the prior art as are devices which may print on a planar surface, however, a need has developed for a completely reliable marking system which may mark a desired message on a planar surface, which may store a plurality of such messages for easy instant retrieval and which may be easily transported in a briefcase, small suitcase or other carrying case.

The following references are known to applicant:

U.S. Pat. No. 3,767,020 to Rowe discloses the concept of a manually positionable, automatic printer which is designed to print symbols (1) on a planar surface (2) via control from a remote Source of command signals via the flexible Cable. The printer which is utilized in the Rowe invention consists of a dot matrix. The invention disclosed in the Rowe patent is of only general interest concerning the teachings of the present invention since the printhead must be continuously moved at a steady speed during the printing operation otherwise all of the printed letters will be printed on top of one another. Furthermore, the flexibility, memory and display capabilities of the present invention are no where found in this patent.

U.S. Pat. No. 3,973,111 to Washizuka et al. teaches the concept of a calculator having a thermal printing head which allows one to print numbers in stamp-like fashion. While this device discloses a self-contained device, its use is limited and it does not include the time and multi-line capabilities of the present invention.

U.S. Pat. No. 3,994,217 to Archilla teaches the concept of a device designed to print the weight of an article on the article responsive to sensing of the weight by a weighing scale. In this patent, the data which is inputted is the weight of the article and there is no provision for selectively entering a desired message. As such, the teachings of this patent are belived to be only generally related to the teachings of the present invention.

U.S. Pat. No. 4,075,945 to Bienholz discloses the concept of a print medium and assembly including the use of a stretchable band on which printing indicia are discretely arranged in linear array and wherein the band is selectively indexed to place the indicia which is desired to be printed in alignment with the print medium. This reference is believed to be of only general interest concerning the teachings of the present invention.

U.S. Pat. No. 4,192,006 to Hausdorff discloses the concept of a portable travel expense tabulator including the provision of being able to print on a tape specific expenses which are entered through depression of buttons having the expense item illustrated thereon. This patent does not disclose printing a predetermined message which has been retained in a memory on a substantially planar surface.

U.S. Pat. No. 4,412,232 to Weber et al. discloses an ink jet printer device which is designed to be incorporated into a hand-held rolling printer best seen in FIG. 1. As was the case in U.S. Pat. No. 3,767,020 to Rowe, the printhead must be moved during the printing operation to ensure correct spacing between the printed indicia.

U.S. Pat. No. 4,414,545 to Sakurada et al. discloses a memory circuit for generating liquid crystal display characters which is of general utility. While the teachings of Sakurada et al. may be utilized as a subcombination element of the present invention in some respect, there is no teaching or suggestion in this patent of the various printing, storage, calculation and time functions of the present invention.

U.S. Pat. No. 4,485,735 to Jonca discloses an automated printing machine and printing unit for such machine which are believed to be only generally related to the teachings of the present invention.

U.S. Pat. No. 4,539,906 to Ogura teaches the concept of a hand-held printer including a drive system designed to be responsive to the depression of buttons to move type carrying belts into the appropriate position for stamping. Of course, the present invention is clearly distinct from the teachings of this patent as including memory for storage prior to printing, time function, calculator function, as well as more advanced printing structure.

U.S. Pat. No. 4,608,923 to Muller discloses the concept of a postal meter value selector sequencing system designed to print indicia on an article inserted therein.

U.S. Pat. No. 4,609,295 to Shimodaira discloses a hand-held printing calculator designed to print indicia on a moving web of paper. The teachings of this patent are believed to be of only general interest concerning the teachings of the present invention.

Accordingly, a need has developed for a self-contained portable, programmable marking device which may be easily transported and which will effectively print a message of up to, for example, four lines of type on a desired substantially planar surface with each line of type having up to at least 40 characters.

SUMMARY OF THE INVENTION

The present invention overcomes the deficiencies in the prior art discussed hereinabove and provides an improved self-contained programmable marking device including the following aspects and features:

(a) In a first embodiment of the present invention, the device is embodied in two pieces which may be detachably interconnected. The first of these pieces is a keyboard-display portion having a keyboard, a display for displaying that which was inputted in the keyboard, memory functions to store information inputted in the keyboard and displayed on the display, as well as an integral time clock which may if desired be activated so as to indicate on the display the date and time.

(b) Included in the structure of the keyboard-display portion is a receptacle which is specifically designed to include electrical contacts contained therein which are designed to transmit effect of all keystrokes as well as time clock and calendar function outputs.

(c) The second piece comprises a removable portable marking device having a housing designed to snugly slidably be received in the receptacle of the keyboard-display portion. On the outside of the housing of the removable portable marking device, contacts are provided which are designed to electrically connect with the terminals contained within the receptacle so that all data which is present at the terminals within the receptacle may be transmitted into the removable portable marking device via the electrical connection between terminals and the contacts.

(d) The removable portable marking device includes a microcontroller with RAM memory designed to temporarily store all data received from the keyboard-display portion via the terminals. Further, the removable portable marking device includes a printer mechanism designed to print on any substantially flat surface which printer mechanism includes a movable print head the operation of which is controlled through the microcontroller contained within the removable portable marking device.

(e) In order to power the microcomputer and the printer contained in the removable portable marking device, a rechargable battery is provided therein and contacts are provided on the exterior of the marking device which mate with terminals in the receptacle of the keyboard-display portion so that whenever the removable portable marking device is secured within the receptacle, the battery thereof is being constantly recharged.

(f) In the operation of the first embodiment of the present invention, when it is desired to print a desired selected message through the use of the marking device, the desired message is inputted using the keyboard in a manner so that the message is displayed in the display in up to four lines of print. If desired, and in appropriate circumstances, information from the real time clock and calculator functions are caused to be displayed on the display as well.

(g) Through the interconnection of terminals within the receptacle and the contact on the marking device, all signals which are caused to be displayed on the display portion of the keyboard-display portion are also transmitted to the random access memory of the removable portable marking device for temporary storage therein. While the marking device is secured within the receptacle the user may make any desired changes in the proposed message which changes will be displayed in the display and which changes will be transmitted to the random access memory of the marking device via the terminals in the receptacle and the contacts on the marking device.

(h) When the desired message has been determined and inputted and displayed, the removable portable marking device may be removed from the receptacle and placed on the area where the message is to be printed. With the marking device maintained in a fixed position on the desired surface, a print button is depressed on the marking device which will cause activation of the printing mechanism under the control of the microcontroller to print the message on the planar surface.

(i) In a second embodiment of the present invention, all of the components described hereinabove are combined into a single housing including the keyboard, the display portion, the real time clock, the calculator function, the temporary storage facility for the proposed message, the printhead and controller therefor. If desired, however, the keyboard may be simplified and operation of the device may occur through the use of magnetic punched cards, bar code input or other media for input including: laser cards, smart cards, etc., with a fixed number of messages. Furthermore, the device may include a reduced size keyboard and a ROM preprogrammed with at least 100 messages which may be accessed through code numbers inputted on the keyboard.

(j) The operation of the second embodiment of the present invention is similar to that of the first embodiment thereof. When the message which is to be printed has been inputted and displayed, the entire device is placed over the planar surface where the message is to be printed and the print button is depressed which activates the printer through the controller therefor to thereby print the message on the surface.

Accordingly, it is a first object of the present invention to provide an improved programmable marking device.

It is a further object of the present invention to provide such an improved programmable marking device including in a first embodiment thereof a keyboard-display portion and a removable portable marking device including a self-contained printer-controller, microcontroller, random access memory and rechargable battery.

It is a still further object of the present invention to provide such an invention wherein any desired message may be inputted, revised and then selectively printed on any desired surface.

It is a still further object of the present invention to provide such a device wherein a large variety of predetermined messages may be stored in the memory section of the device and may be displayed and thereafter printed merely by depression of a few keys on the keyboard.

It is a still further object of the present invention to provide such an invention wherein all the components thereof are integrated into a single housing of portable size.

These and other objects, aspects and features of the present inventions will be better understood from the following detailed description of the preferred embodiments when read in conjunction with the appended drawing figures.

SPECIFIC DESCRIPTION OF THE PREFERRED EMBODIMENTS

Figure 1:
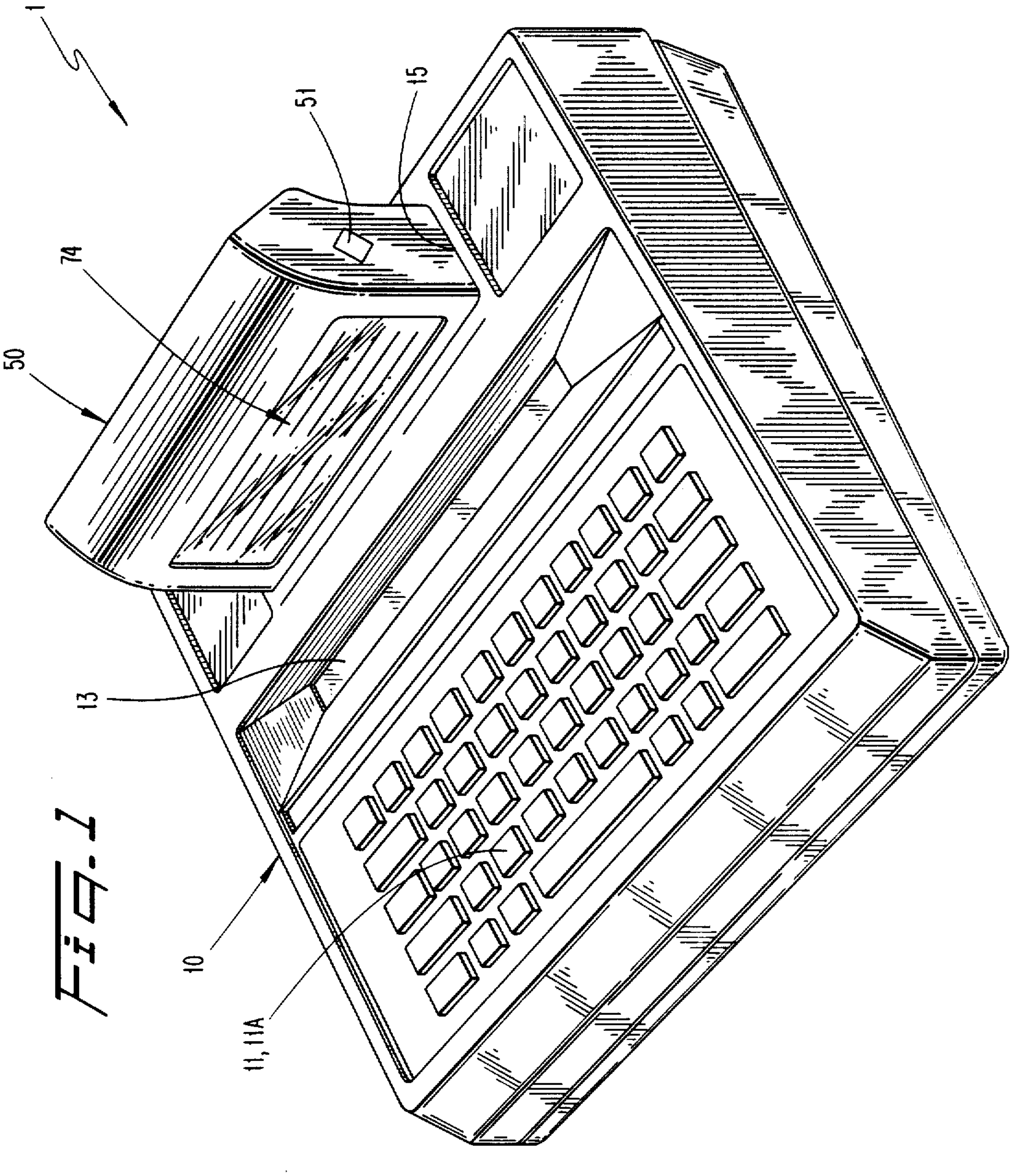
FIG. 1 shows a perspective view of a first embodiment of the present invention.
Figure 2:
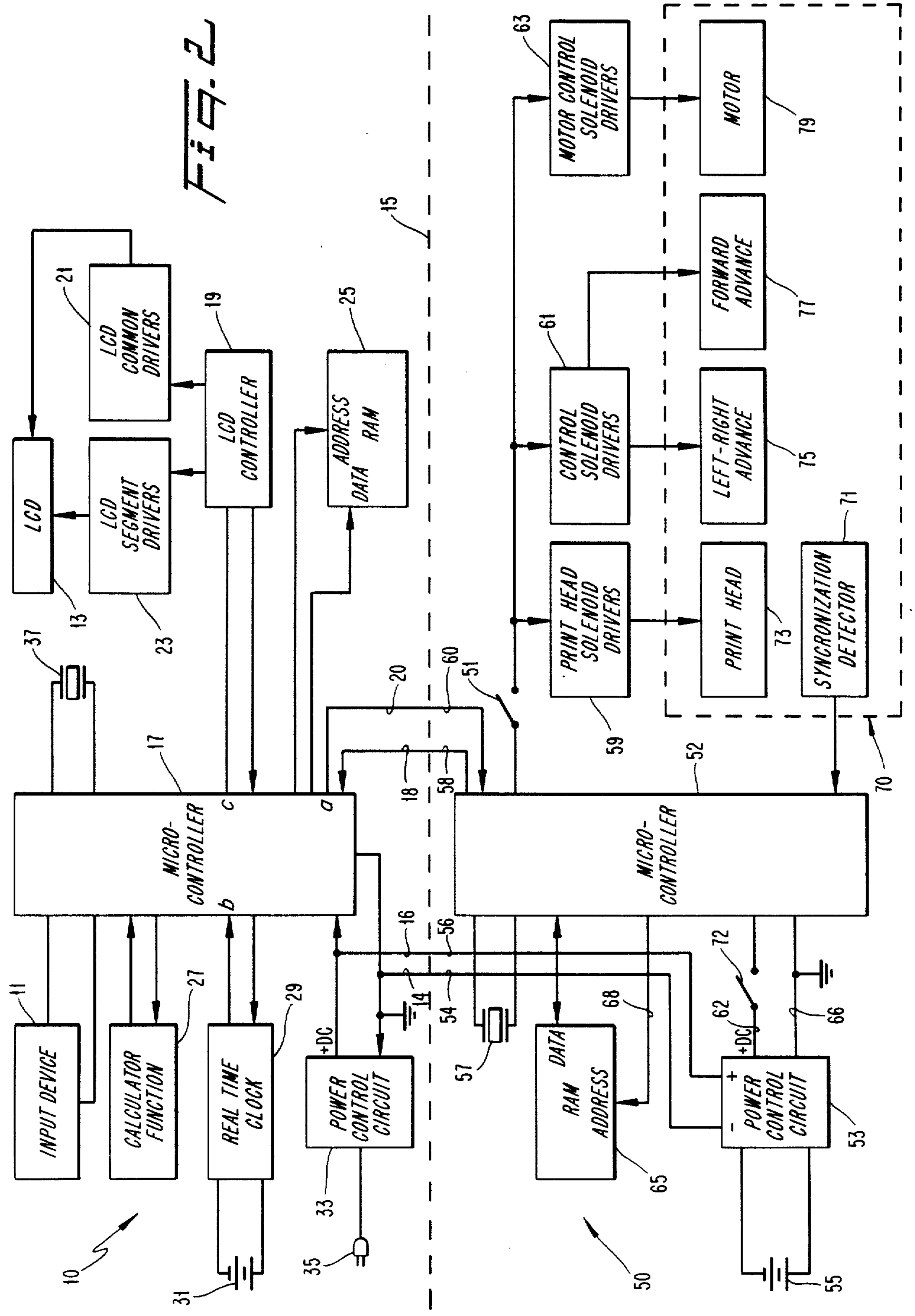
FIG. 2 shows a schematic representation of the electrical circuitry included in the embodiment of FIG. 1.

With reference first to FIGS. 1 and 2, a first embodiment of the present invention will now be described. The inventive improved programmable marking device is generally designated by the reference numeral 1 in FIG. 1 and is seen to include a keyboard-display portion 10 and a removable portable marking device 50. As seen in FIG. 1, the keyboard-display portion includes an input device 11, such as a keyboard 11A including various numbers and letters such as those which would be displayed on a typewriter or computer keyboard, including designations for capital letters and small letters and other symbols such as "%", "$" and the like.

The keyboard-display portion includes a display 13 which may be of the LCD type and which may if desired include room for display of up to four lines of print. In the present invention, it is contemplated that up to four lines of 40 characters and spaces combined may be displayed and printed. Of course, other configurations may be utilized, only limited by that which is well known in the art.

FIG. 1 also shows the keyboard-display portion to include a nest 15 which comprises a generally rectangular portion sized to snugly and removably receive the removable portable marking device 50. Not seen in FIG. 1 but contained within the nest 15 are a plurality of terminals 14, 16, 18 and 20 which are respectively designed to electrically interconnect with respective contacts 54, 56, 58 and 60 located on the exterior of the removable portable marking device 50. As further seen in FIG. 1, the marking device 50 includes a print button 51 which when depressed with the marking device 50 removed from the nest 15 and placed on a planar surface, will result in activation of the printer to print the message which has been inputted on the keyboard 11A. Not shown in FIG. 1 but usable in conjunction with the marking device 50 is a microswitch 72 (FIG. 2) mounted on the bottom thereof which may be utilized to sense that the marking device 50 is actually placed on a planar surface. The print button 51 is only operative to activate the printer of the marking device 50 when the microswitch 72 described above has been depressed by virtue of the marking device 50 having been placed on a planar surface. The marking device 50 also includes a repertory message list 74 designed to display a list of messages programmed into the RAM 25 alongside the code number which should be inputted into the keyboard 11A to access the message.

With reference now to FIG. 2, a schematic diagram of the electrical circuitry included in the first embodiment of the present invention is clearly shown. The dotted line designated by the reference numeral 15 is a schematic representation of the nest 15 seen in FIG. 1 and in this regard FIG. 2 shows the terminal 14 interconnected with the contact 54, the terminal 16 interconnected with the contact 56, the terminal 18 interconnected with the contact 58 and the terminal 20 interconnected with the contact 60.

The keyboard-display portion 10 as schematically depicted in FIG. 1 is seen to include the input device 11 and the display 13 and further includes driver circuitry for the display 13 including a LCD controller 19, an LCD common drivers device 21 and a LCD segment drivers device 23 with the common drivers and segment drivers devices being controlled by the controller 19.

Also schematically shown in FIG. 1 is the power control circuitry 33 for the keyboard-display portion 10 which is seen to include a plug 35 which is designed to be plugged into an AC receptacle. The microcontroller 17 controls all functions of the keyboard-display portion including receiving inputs from the input device 11 and channeling them to the display 13 via the controller 19, receiving calculation requests from the input device 11 and transmitting them to the calculator function 27, while receiving results from the calculator function 27 and sending them to the display 13. Further, the microcontroller controls the operation of the real time clock 29 which includes a battery back-up circuit 31 and the microcontroller 17 receive signals from the real time clock which may be forwarded to the printer 13 when it is desired to print time data on the message which is to be printed.

Furthermore, if desired, the user may program into the keyboard-display portion 10 various messages which may be used quite often. When it is desired to program these messages into the keyboard-display portion 10, the messages are inputted by the keyboard 11A or other input device and are stored in the random access memory 25 for later retrieval as desired through depression of the appropriate keyboard buttons designated to instruct the microcontroller 17 to retrieve messages from the random access memory 25.

As noted hereinabove, the keyboard-display portion is powered by AC power through the plug 35. As best seen in FIG. 2, the terminals 14, 16 respectively interconnect with the contacts 54, 56 of the removable portable marking device, which contacts 54, 56 supply the power control circuitry 53 and the rechargable battery 55 of the marking device 50. As should be understood by those skilled in the art, the power control circuitry 53 is designed to sense interconnection of the terminals 14, 16 with the contacts 54, 56 and in such mode to channel current to the battery 55 to recharge it, and, to sense when the terminals 14, 16 are disconnected from the contacts 54, 56 so as to allow the power in the battery 55 to be channeled through the lines 62, 66 to the microcontroller 52 of the marking device 50.

The marking device 50 includes a random access memory device 65 which, when the marking device 50 is contained within the cradle 15 receives all inputs provided to the computer from the keyboard 11 via the microcontroller 17 port a, the terminal 20, the contact 60, the microcontroller 52 and the connection line 68. Thus, when the desired message is inputted into the keyboard-display portion 10 through the use of the input device 11, the desired message is simultaneously displayed on the display 13, and held in the random access memory 65.

When the marking device 50 has been removed from the cradle 15, this is sensed by the power control circuitry 53 which then causes the battery 55 to power the marking device 50. In this mode, when the print button 51 of the marking device 50 is depressed and the above-described microswitch indicates that the marking device is on a planar surface, the message which is in the random access memory 65 is transmitted to the microcontroller 52 which provides the appropriate instructions to the driver devices 59, 61, 63 to control the printer 70.

As seen in FIG. 2, the printer 70 includes a printhead 73, a left-right advance device 75, a forward advance clutch control 77, a motor 79 and a synchronization detector 71 which provides feedback to the microcontroller 52 so that the microcontroller knows that the proper message is being printed.

If it is desired to retrieve a message from the random access memory 25 and print that message, the appropriate key is depressed on the keyboard 11A to bring the message up on the display 13, and in such case, the same message is simultaneously sent through the terminal 20, contact 60, microcontroller 52 and line 68 to the random access memory 65 of the marking device 65. Once the message has been temporarily stored in the random access memory 65, the operation of the device is the same as explained above with the marking device 50 being removed from the nest 15 to cause the rechargable battery 55 to power the system, and with depression of the print button 51 with the microswitch indicating placement of the device on a planar surface resulting in printing of the appropriate message on the planar surface. The keyboard 11A and RAMs 25, 65 may be organized for repertory storage and recall of messages. If it is desired to be able to recall messages from the device 50, adjacent each entry on the repertory message list 74 is provided an actuator button.

The oscillators 37 and 57 are provided for the respective microcontrollers 17 and 52 for purposes well known to those skilled in the art.

If it is desired to utilize the present invention for its calculator functions, through inputting of the appropriate keys on the keyboard 11, the calculator 27 is electrically coupled with the microcontroller 17 so that any desired calculation may be undertaken with the steps undertaken in performing the calculation being displayed on the display 13. If it is desired to print the finished calculation on a planar surface, the final entry which is displayed on the display 13 will also be stored in the random access memory 65 and may be printed in the manner described hereinabove. In a similar fashion, if it is desired to print a time alone or along with a message, the appropriate keys are depressed on the keyboard 11A to cause an output from the real time clock 29 to be seen at the port b of the microcontroller, which time data is then forwarded to the display 13 via the port c in the LCD controller 19.

In a preferred embodiment of the present invention the printer 70 is a modified dot matrix impact printer. Dot matrix impact printers as they are manufactured for use in the industry normally include a print section adjacent a spool supply section wherein a spool of paper is fed past the printhead in a controlled manner so that messages may be printed thereon. In applying such a printer to the teachings of the present invention, the spool supply section is not necessary since it is desired to print directly on a planar surface and not on a spool of paper. Thus, in modifying a dot matrix printer so that it is compatible with the present invention, the spool supply section is merely removed so that the bottom portion of the remaining printer structure consists of the printhead and the print ribbon which is used to impress markings on the desired planar surface. Of course, other types of printers can be used in stead of the dot-matrix impact printer; e.g. ink-jet, laser, non-impact thermal/transfer tape, etc; in short, any print mechanism which can be adapted to print on a planar surface. The above-described microswitch is added to the system in series with the print activation switch 51 so that depression of the print activation switch 51 is only operative to activate the printer when the printhead is adjacent a planar surface.

Figure 3:
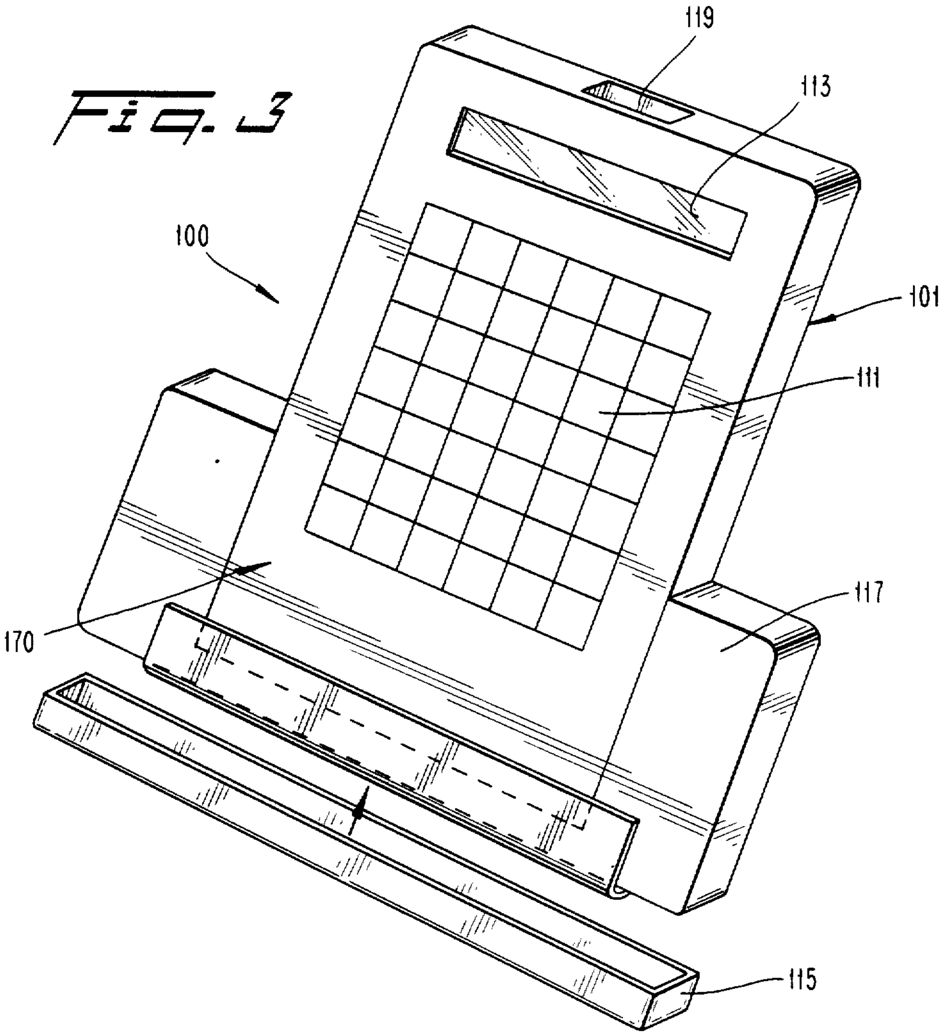
FIG. 3 shows a perspective view of a further embodiment of the present invention.
Figure 4:
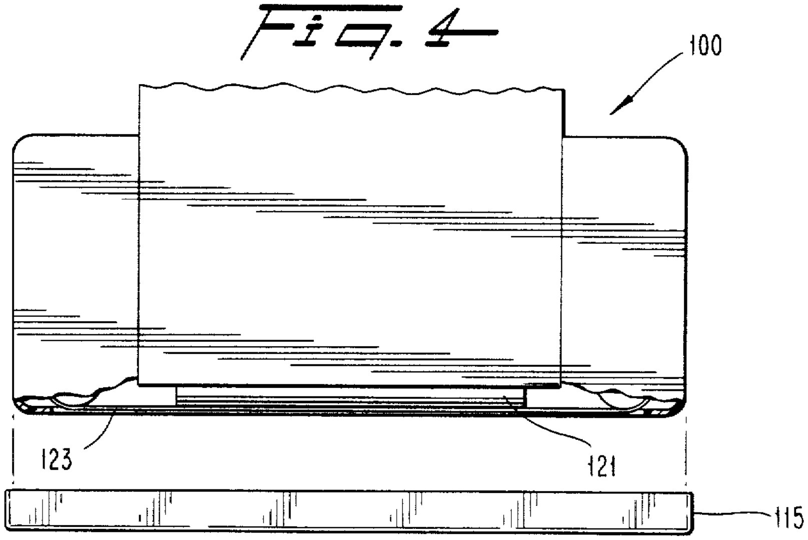
FIG. 4 shows an enlarged detailed view of the embodiment of FIG. 3 showing details of the removable print head, ribbon and dust cover.

With reference now to FIGS. 3 and 4, a second embodiment 100 of the present invention is seen to include a single self-contained housing 101 including all keyboard, display and printing functions combined into a single housing. As seen in FIG. 3, the housing 101 includes the keyboard portion 111 which may include every function of the keyboard 11A of the embodiment of FIGS. 1 and 2, a display 113 which may be of the LCD or LED type and may have the same capacity to display the same number of characters and spaces as the display 13 of the embodiment of FIGS. 1 and 2, a printer section 170 having a printer corresponding to the printer 70 of the embodiment of FIGS. 1 and 2 and a clip on-type ribbon cassette 117 corresponding to that which is used in the embodiment of FIGS. 1 and 2 which may slide in and out with respect to a slot (not shown) formed in the bottom of the housing 101 for this purpose.

In a further aspect, a dust cover 115 may be provided which may cover the exposed portion of the ribbon when the device 100 is not being used.

With reference to FIG. 4, the printhead 121 is seen to be closely spaced above the ribbon 123 itself and the housing 118 of the ribbon 117 includes extending wings 120 designed to removably snap into portions of the recess (not shown) in the bottom of the housing 100.

The operation of the embodiment of FIGS. 3 and 4 is similar to that of the embodiment of FIGS. 1 and 2. The main difference lies in the fact that only one random access memory is needed for storage of messages to be immediately printed since the print functions are not removable from the keyboard-display functions. Thus, the random access memories 25 and 65 may, if desired, be combined in a single random access memory having one section to store messages which are commonly used and providing a second section to receive and temporarily store messages which are to be immediately printed. Of course, if desired, the two separate random access memories corresponding to reference numerals 25 and 65 in FIG. 2 may be retained if space permits.

In a further aspect, the power control circuitry 53 may be included in the device 100 if the connection 119 thereof provides the alternative of AC connection or a rechargable battery which is contained internally within the housing 101. Of course, as space permits, the calculator function 27 and real time clock 29 with its own small battery backup 31 may be retained in the house 101. All aspects of the printer 70 including the driver devices 59, 61 and 63 are retained in the device 101 with functions corresponding to those which are described hereinabove.

The operation of the device 100 should be self-evident from the above description. When it is desired to print a selected message through the use of the device 100, the desired message is inputted on the keys 111 and simultaneously displayed on the display 113 and stored within the storage device 65. The user reads the display 113 and performs any corrections in a manner well-known to those skilled in the art and when satisfied that the message is as it is to be printed, places the printhead 121 on a planar surface whereupon the above-described microswitch (not shown) will give indication to the system that the printhead 121 is adjacent a planar surface. Thereafter, depression of the print button contained in the keyboard 111 will result in printing of the message on the planar surface. Again, if it is desired to store a plurality of commonly used messages for later retrieval, such messages may be inputted in the keyboard 111 and through depression of the appropriate buttons forwarded to the random access memory corresponding to that which is designated by reference numeral 25 in FIG. 2 for later retrieval. Similarly, responsive to the depression of the appropriate buttons on the keyboard 111, information from a real time clock corresponding to the clock 29 of the embodiment of FIGS. 1 and 2 may be obtained and displayed and printed, and similarly, a calculator function corresponding to that which is designated by the reference numeral 27 in FIG. 2 may be employed.

Accordingly, an invention has been disclosed in terms of two preferred embodiments thereof, which overcome all of the deficiencies in the prior art discussed hereinabove and provide a unique self-contained marking device which may mark a predetermined and selected message on any desired planar surface whether it be a wall, floor, piece of paper, package invoice or any other of a variety of such surfaces. Of course, various modifications, alterations and changes in the teachings of the present invention may be contemplated by those skilled in the art without departing from the intended spirit and scope thereof. As such, it is intended that the present invention only be limited by the terms of the appended claims.

What is claimed is:

1. An improved programmable marking device comprising:

a microcontroller having memory means for storing data;

input means connected to said microcontroller for inputting said data to said memory means;

display means connected to said microcontroller for displaying said data substantially simultaneously with the inputting thereof;

printer means controlled by said microcontroller for printing said data;

said printer means including a print head means for placement against and for printing said messages on a substantially planar surface;

print activation means for activating said printer means; and means for disabling said print activation means until said print head means is placed on a substantially planar surface;

such that data may be inputted, substantially simultaneously displayed on said display means stored in said memory means and thereafter selectively printed on said substantially planar surface located externally of said housing.

2. An improved programmable marking device, comprising:

a housing;

a microcontroller within said housing having memory means for storage of messages;

input means connected to said microcontroller for inputting said messages;

display means connected to said microcontroller for displaying said messages substantially simultaneously with the inputting thereof;

printer means controlled by said microcontroller for printing said messages; and said printer means including a print head means for placement against and for printing said messages on a substantially planar surface located externally of said housing;

such that a message may be inputted, substantially simultaneously displayed on said display means and stored in said memory means and thereafter selectively printed on said substantially planar surface located externally of said housing.

3. The invention of claim 2, wherein said input means comprises a keyboard.

4. The invention of claim 2, wherein said input means comprises a punched card and reader therefor.

5. The invention of claim 2, wherein said input means comprises a bar code label and reader therefor.

6. The invention of claim 2, wherein said device comprises a single housing having mounted thereon said microprocessor, input means, display means and printer means.

7. The invention of claim 2, wherein said printer means comprises dot matrix printer, said print head means including a movable ribbon adapted to lie adjacent said substantially planar surface, in use.

8. The invention of claim 7, further including a removable cover for said print head.

9. The invention of claim 2, wherein said device includes:

(a) a first housing having mounted therein said input means, microprocessor and display means;

(b) a second housing, separate and distinct from said first housing, having mounted therein said printer means.

10. The invention of claim 9, wherein said first housing includes a nest means comprising a socket for removably receiving said second housing, said socket including contacts connectable with terminals on said second housing when said second housing is within said socket, said contacts and terminals electrically connecting said microprocessor and said printer means.

11. The invention of claim 10, wherein said second housing has further memory means operatively connected to said microprocessor when said second housing is within said socket for storing messages displayed on said display means and stored in said memory means.

12. The invention of claim 11, wherein said first housing includes connection means for connecting said microprocessor to a source of electricity, said second housing including a power control circuit and battery means connected thereto, whereby when said second housing is in said socket, said source of electricity is connected via said socket to said power control circuit and said power control circuit is operative to recharge said battery means, and, further wherein when said second housing is removed from said socket, said power control circuit is operative to cause said battery means to power said printer means.

13. The invention of claim 11, wherein said further memory means includes storage means for storing a repertory message list.

14. The invention of claim 13, wherein said second housing includes further display means for displaying a list of repertory messages stored in said storage means and means for accessing desired repertory messages.

15. The invention of claim 2, further including calculator means connected to said microprocessor for enabling calculation of numerical sums to be carried out by said device, displayed on said display means, stored in said memory means and printed by said printer means.

16. The invention of claim 2, further including time monitoring means including day, date and time functions for monitoring data as to the day, date and time, said data being selectively displayed, stored and printed along with a desired message.

17. The invention of claim 2, wherein said printer means is of the dot matrix type and said print head means comprises a print head and a ribbon overlying said print head and adapted to engage said substantially planar surface whereby impressions created by said print head are printed on said substantially planar surface.

18. The invention of claim 2, further comprising:

print activation means for activating said printer means; and means for disabling said print activation means until said print head means is placed on said substantially planar surface located externally of said housing.

19. An improved programmable marking device, comprising:

a keyboard-display housing including a socket therein;

a microcontroller within said keyboard-display housing and having a first memory means for storage of messages;

input means mounted to said keyboard-display housing and connected to said microcontroller for inputting said messages;

display means mounted to said keyboard-display housing and connected to said microcontroller for displaying said messages substantially simultaneously with the input thereof;

said socket including contacts mounted therein connected to said microcontroller;

a portable marking device housing, separate and distinct from said keyboard-display housing, sized to snugly fit into said socket of said keyboard-display housing;

a portable power source mounted within said portable marking device housing;

terminal means on said portable marking device housing for electrically connecting with said contacts of said socket of said keyboard-display housing when said portable marking device housing is fit snugly within said socket;

a further microcontroller, mounted within said portable marking device housing, and connected to said portable power source and having a further memory means for storage of said messages upon transmission thereof from said first memory means via said contacts and said terminal means;

printer means, mounted in said portable marking device housing and controlled by said further microcontroller, for printing said messages.

20. The invention of claim 19, wherein said first housing includes means for connecting said microprocessor to a fixed power source, said portable power source further including a control circuit interconnected with said fixed power source when said second housing is within said receptacle, whereby in such instance, said control circuit is operative to disconnect said portable power source from said further microprocessor and to recharge said portable power source and further whereby when said second housing is removed from said receptacle, said portable power source powers said further microprocessor.

21. The invention of claim 19, wherein said printer means includes a print head means for placement against and for printing said messages on a substantially planar surface located externally of said portable marking device housing.

22. The invention of claim 21, further comprising:

print activation means for activating said printer means; and means for disabling said print activation means until said print head means is placed on said planar surface located externally of said portable marking device housing.

* * * * *